United States Patent
Schondorf

(10) Patent No.: US 11,176,827 B2
(45) Date of Patent: Nov. 16, 2021

(54) EXTENDABLE BLIND SPOT SENSORS AND METHODS OF USE

(71) Applicant: Ford Global Technologies, LLC, Dearborn, MI (US)

(72) Inventor: Steven Schondorf, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/752,172

(22) Filed: Jan. 24, 2020

(65) Prior Publication Data

US 2021/0233407 A1 Jul. 29, 2021

(51) Int. Cl.
  *G08G 1/16* (2006.01)
  *B60R 1/00* (2006.01)
  *B60R 11/04* (2006.01)
  *G06K 9/00* (2006.01)
  *B60R 11/00* (2006.01)

(52) U.S. Cl.
  CPC ............. *G08G 1/167* (2013.01); *B60R 1/003* (2013.01); *B60R 11/04* (2013.01); *G06K 9/00791* (2013.01); *B60R 2011/0092* (2013.01); *B60R 2300/802* (2013.01); *B60R 2300/8066* (2013.01)

(58) Field of Classification Search
  CPC ......... G08G 1/167; B60R 11/04; B60R 1/003; B60R 2300/8066; B60R 2300/802; B60R 2011/0092; G06K 9/00791
  See application file for complete search history.

(56) References Cited

U.S. PATENT DOCUMENTS

| | | | |
|---|---|---|---|
| 9,211,889 B1* | 12/2015 | Hoetzer | G01S 15/931 |
| 10,286,916 B2 | 5/2019 | Prasad et al. | |
| 2014/0303849 A1* | 10/2014 | Hafner | B60W 50/14 701/42 |
| 2016/0041258 A1* | 2/2016 | Cashler | G01S 7/521 342/70 |
| 2016/0243988 A1* | 8/2016 | Peterson | G06K 9/00805 |
| 2017/0124881 A1* | 5/2017 | Whitehead | B60Q 9/008 |
| 2017/0294128 A1* | 10/2017 | Lai | G08G 1/167 |
| 2017/0298675 A1* | 10/2017 | Dimig | B60Q 1/0076 |
| 2018/0061239 A1* | 3/2018 | Prasad | G06K 9/00791 |
| 2018/0109762 A1 | 4/2018 | Aich et al. | |
| 2018/0197417 A1* | 7/2018 | Burtch | G08G 1/167 |
| 2018/0356527 A1 | 12/2018 | Ondrej et al. | |
| 2019/0189015 A1* | 6/2019 | Gesch | B60R 1/0612 |
| 2019/0241126 A1* | 8/2019 | Murad | B60R 1/12 |

OTHER PUBLICATIONS

"BLIS® with Trailer Coverage | Ford Co-Pilot 360™ Technology," Web page <https://www.ford.com/technology/driver-assist-technology/blis-trailer-coverage/.html>, 5 pages, retrieved from the internet on Oct. 26, 2020.
"2019 RV & Trailer Towing Guide Ford" (41 Pages).

* cited by examiner

Primary Examiner — Richard A Hansell, Jr.
(74) Attorney, Agent, or Firm — Frank Lollo; Eversheds Sutherland (US) LLP

(57) ABSTRACT

Extendable blind spot sensors and methods of use are provided herein, which may include a blind spot sensor configured to monitor a blind spot of a vehicle and an extender in mechanical communication with the blind spot sensor. The extender is configured to move the blind spot sensor between a first position and a second position when a trailer is attached to the vehicle.

18 Claims, 4 Drawing Sheets

402 — Determining that a trailer is attached to a hitch receiver of a vehicle

404 — Determining when a field of view of a blind spot sensor of a vehicle is at least partially blocked by the trailer 406 — Laterally extending the blind spot sensor away from the body of the vehicle until the field of view of the blind spot information sensor is no longer blocked by the trailer

EXTENDABLE BLIND SPOT SENSORS AND METHODS OF USE

FIELD

The present disclosure is generally directed to blind spot detection and to movable or extendable blind spot sensors for use when a trailer is attached to a vehicle.

BACKGROUND

Blind spot indicators and associated sensor are used to determine when an approaching vehicle is entering a blind spot of a vehicle. These blind spot indicators can be used for any portion of a vehicle where a blind spot is present. Each vehicle model may have its own blind spots and may have a unique number and/or positioning of blind spot sensors.

In some instances, trailers, such as gooseneck and fifth wheel trailers, are so close to a back of a vehicle that they block the field of view of the rear corner blind spot sensors that provide the blind spot detection feature. Consequently, the feature may be switched off when such a trailer is attached.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Blind spot sensors are configured to monitor for objects in a blind spot of a vehicle. That is, the blind spot sensors may be configured to monitor a field of view that covers all or a portion of one or more blind spots of the vehicle. The present disclosure is directed to selectively extending or retracting one or more of the blind spot sensors in order to adjust the field of view of the blind spot sensors when a trailer is attached to the vehicle. For example, a blind spot sensor can be mounted to (or integrated into) a vehicle component, such as a tail light, a quarter panel, a bumper, and so forth. The blind spot sensor can be mounted to and/or incorporated into any vehicle component. In some instances, the vehicle component can be configured to extend and retract from the vehicle, which results in lateral displacement of the blind spot sensor. For example, the vehicle component, with the blind spot sensor attached thereto and/or incorporated therein, may extend and retract laterally from the vehicle in order to ensure that the blind spot sensor is not obstructed by the trailer. Alternatively, the blind spot sensor itself can be configured to extend and retract from the vehicle component without movement of the vehicle component.

A device, such as a mechanical extender, may be used to extend and retract the vehicle component and/or the blind spot sensor. In some instances, the device may be connected to the vehicle component, which may be coupled to the blind spot sensor. In other instances, the device may be coupled directly to the blind spot sensor. The device may be manually operated or include an actuator for automatic operation. For example, in one embodiment, the device may comprise a mechanical actuator that is coupled to the vehicle body. The mechanical actuator may be configured to extend and retract the vehicle component and/or the blind spot sensor. In some configurations, the device may be configured to pivot or hinge to reposition the field of view sensed by the blind spot sensor. For example, when the blind spot sensor is fully extended, but the field of view is still at least partially obstructed by the trailer, the blind spot sensor can be tilted or pivoted to ensure that the field of view sensed by the blind spot sensor is not obstructed by the trailer.

Illustrative Embodiments

Figure 1:
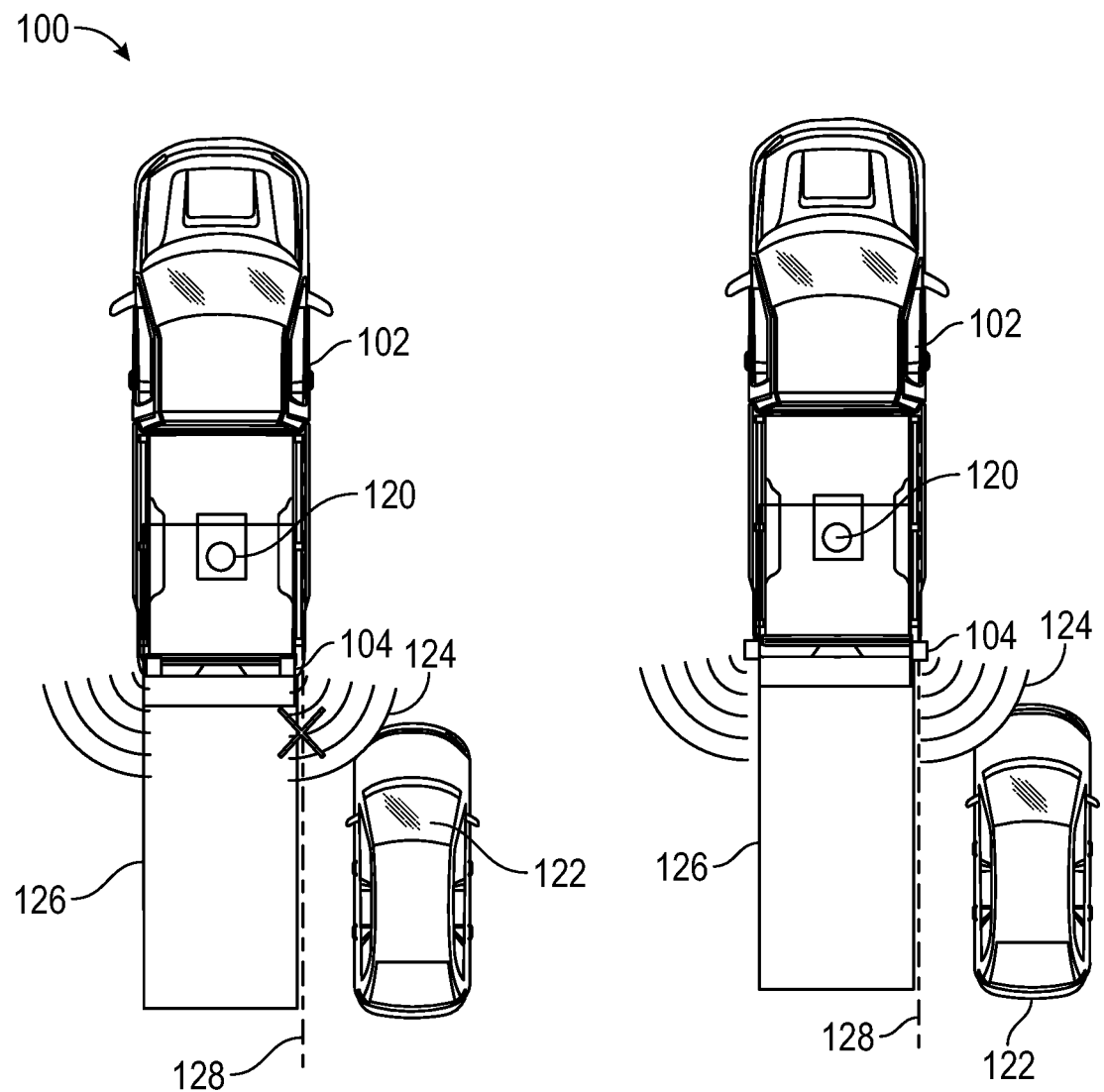
FIG. 1 depicts an illustrative architecture in which techniques and structures for providing the systems and methods disclosed herein may be implemented.
Figure 1:
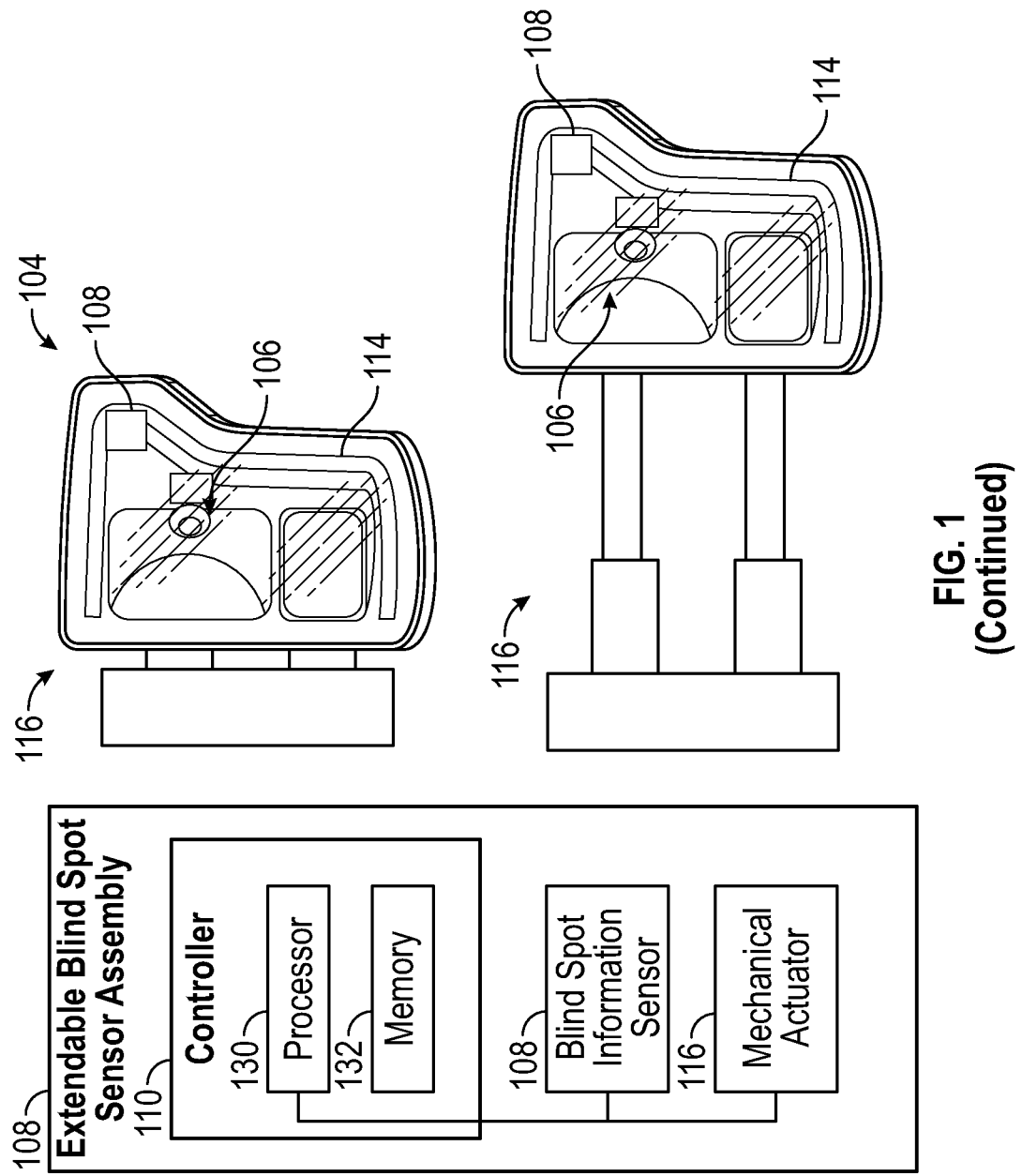
Figure 2:
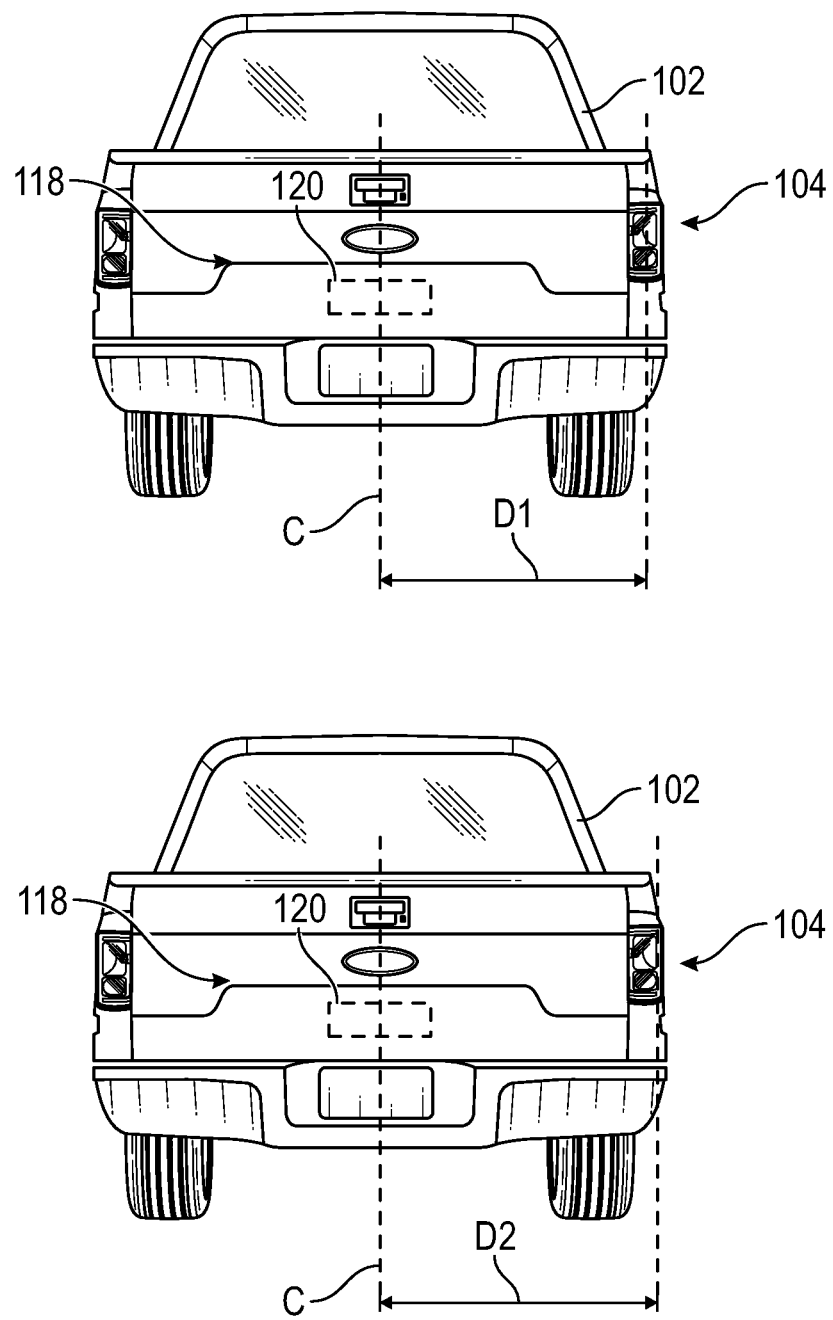
FIG. 2 illustrates rearward perspective views of a vehicle having extendable blind spot sensor assemblies in both neutral and extended configurations.

Turning now to the drawings, FIG. 1 depicts an illustrative architecture 100 in which techniques and structures of the present disclosure may be implemented. FIG. 2 illustrates a rearward portion of a vehicle 102 having an extendable blind spot sensor assembly 104. As depicted in FIG. 1, the extendable blind spot sensor assembly 104 may be embodied as a tail light assembly.

In some instances, the extendable blind spot sensor assembly 104 can comprise a tail light 106, a blind spot sensor 108, and a controller 110. The tail light 106 can be positioned in a housing that is covered with a colored lens 114. Again, while a tail light assembly has been disclosed as an example embodiment, the extendable blind spot sensor assembly can be formed as a part of a rear quarter panel or bumper, or any other desired vehicle component.

The extendable blind spot sensor assembly 104 may include a mechanical extender, such as a mechanical actuator 116. The mechanical extender can include any mechanism, such as mechanical linkages, a pneumatically driven armature, motor, electromagnets, or any other mechanical components that are configured to mechanically extend and/or retract. In general, the mechanical actuator 116 couples the extendable blind spot sensor assembly 104 to a body of the vehicle 102. Hydraulic and/or electrical actuation members can also be used in some configurations. In other instances, the extendable blind spot sensor assembly 104 can travel along a track system when extending and retracting. The blind spot sensor assembly 104, in particular the extender, may be moved manually or actuated via an actuator or the like.

In another example, the mechanical actuator 116 couples the extendable blind spot sensor assembly 104 to a section of a tailgate 118 of the vehicle 102. The mechanical actuator 116 can be operated manually or can be operated automatically by the controller 110.

The blind spot sensor 108 can sense the presence of objects, such as another vehicle 122 in a blind spot 124 of the vehicle 102. A field of view of the blind spot sensor 108 covers all or some of the blind spot 124 of the vehicle 102. For purposes of brevity and clarity, it will be assumed that the field of view of the blind spot sensor 108 and the blind spot 124 are coextensive in size with one another. In some instances these may not be identical in size such that the blind spot sensor 108 may only monitor a portion of the blind spot 124.

As illustrated in FIG. 2, the extendable blind spot sensor assembly 104 can be extended from a first, neutral position P1 that is a first lateral distance D1 from a centerline C of a receiver 120 of the vehicle 102 to a second, extended position P2 that is a second lateral distance D2 away from the receiver 120. To be sure, in this example, there is a first extendable blind spot sensor assembly associated with a right-side tail light and a second extendable blind spot sensor assembly associated with a left-side tail light.

Referring to FIGS. 1 and 2 collectively, when the extendable blind spot sensor assembly 104 is in the first, neutral position P1, the blind spot sensor 108 monitors for objects in the blind spot 124. When a trailer 126 is attached to the receiver 120, a portion of the trailer 126 is within the blind spot 124, causing the blind spot sensor 108 to sense that an object is present in the blind spot 124. In this example, the trailer 126 will be understood to have a gooseneck connector that couples with the receiver 120.

Stated otherwise, the trailer 126 blocks at least a portion of the field of view of the blind spot sensor 108. The blind spot sensor 108 detects this blocking or presence. A signal indicative of this presence or blocking of the blind spot can be relayed to a driver of the vehicle 102 through a dashboard indicator, by way of example. The extendable blind spot sensor assembly 104 can be transitioned to the second, extended position P2 to move the blind spot sensor 108 laterally so that the trailer 126 has less encroachment into the field of view of the blind spot sensor. That is, the blind spot sensor 108 can now sense the presence of objects next to the trailer 126 since the blind spot sensor 108 has been moved laterally away from the vehicle 102 and trailer 126. The extendable blind spot sensor assembly 104 can be translated back and forth between the first, neutral position P1 and the second, extended position P2 as needed. As noted above, the extendable blind spot sensor assembly 104 can be laterally moved by a user through manual manipulation.

In some configurations, when the extendable blind spot sensor assembly 104 is moved laterally and away from the vehicle body, the field of view of the blind spot sensor 108 also moves laterally to monitor an area of the blind spot 124 that is located outside an outer perimeter or reference edge 128 of the trailer 126.

In instances where the extendable blind spot sensor assembly 104 is extended fully to the second, extended position P2, and the trailer 126 is still sensed within the blind spot 124, the extendable blind spot sensor assembly 104 can be pivoted or hinged to change an orientation of the extendable blind spot sensor assembly 104.

Figure 3:
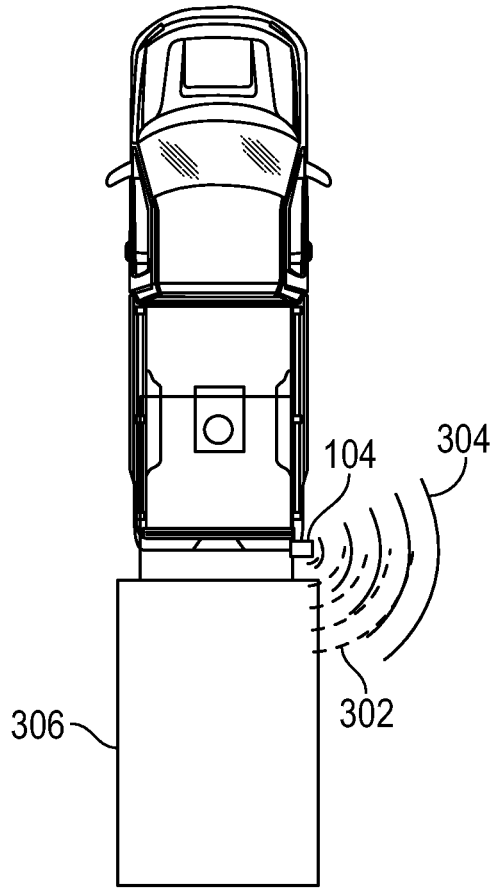
FIG. 3 illustrates an example schematic view of the rotation of an extendable blind spot sensor assembly.

As illustrated in FIG. 3, the extendable blind spot sensor assembly 104 is tilted so that the field of view of the extendable blind spot sensor assembly 104 is angularly altered. For example, if a width of the trailer 126 is such that even when the extendable blind spot sensor assembly 104 is fully extended the trailer 126 is sensed in the blind spot 124, the extendable blind spot sensor assembly 104 can be pivoted to point out and in front of the trailer 126.

While some examples above describe the extendable blind spot sensor assembly 104 as being manually controllable, the extendable blind spot sensor assembly 104 can also be controlled (extension and/or pivoting) through use of the controller 110.

The controller 110 can comprise a processor 130 and memory 132. The memory 132 stores instructions that can be executed by the processor 130 to perform aspects of automated of blind spot occlusion monitoring and blind spot sensor assembly movement. When referring to operations executed by the controller 110 it will be understood that this includes the execution of instructions by the processor 130. In general, the controller 110 can be embedded into the vehicle component, such as the tail light, the bumper, or a rear quarter panel. In another example, the controller 110 can include another controller within the vehicle that has been configured to provide the automated blind spot occlusion monitoring and blind spot sensor assembly movement functions disclosed herein. The controller 110 can be located at a distance from the rear of the vehicle 102, such as in a console of the vehicle 102. The controller 110 can be communicatively coupled to the blind spot sensor 108 and/or the mechanical actuator 116 via a wired or wireless connection. The wireless connection could include any short-range wireless connection such as Bluetooth, Near-Field Communications, Infrared, or radio frequency (RF) communications.

In one example, the controller 110 can determine when the trailer 126 is attached to the receiver. This could occur when the controller 110 determines that a wired connection to the trailer for braking and power has been connected to a socket of the vehicle 102. In another example, the controller 110 can determine when an object is present in the blind spot 124 and further determine that the object is persisting in the blind spot. The controller 110 could also obtain images from a backup camera of the vehicle 102 and determine the presence of the trailer from the images. A driver of the vehicle could also select a trailer connected blind-spot mode from a menu provided on a human machine interface of the vehicle 102.

Regardless of method used if the controller 110 determines that the trailer is present in the blind spot 124, the controller 110 can transmit signals to the mechanical actuator 116 to extend the blind spot sensor 108. Again, in some instances the blind spot sensor 108 can be positioned inside a housing such as a tail light. In other instances the blind spot sensor 108 can alone be extended. For example, if the blind spot sensor 108 is mounted to or associated with a quarter panel, rather than the tail light, the blind spot sensor 108 may be extend by itself rather than requiring the entire quarter panel (or even a portion of the quarter panel) to extend as well. Thus, the blind spot sensor 108 may be mounted directly to a terminal end of the mechanical actuator 116 and can translate independently of any vehicle component.

As the extendable blind spot sensor assembly 104 is being extended, the controller 110 can continue to receive signals from the blind spot sensor 108 as to whether the trailer is present in the blind spot or not. Once the trailer is not detected in the blind spot, the controller 110 can stop movement of the extendable blind spot sensor assembly 104.

In instances where the extendable blind spot sensor assembly 104 is extended to the full, extended position P2 and the trailer is still present in the blind spot 124, the controller 110 can cause the extendable blind spot sensor assembly 104 to pivot or tilt to angle the field of view of the blind spot sensor 108. The pivoting or tilting can occur through control of a servo or motor by the controller 110.

In one example use case, the controller 110 can be configured to determine when a trailer is attached to the hitch receiver. The controller 110 can be configured to determine when a field of view of the blind spot sensor is blocked by the trailer and further to cause the mechanical actuator to laterally extend the vehicle tail light away from the body of the vehicle until the field of view of the blind spot sensor is no longer blocked.

Rather than pivoting the extendable blind spot sensor assembly 104, the controller 110 can ignore the presence of the trailer in the blind spot sensor signal. Thus, the controller 110 may only determine that an object is in the blind spot when an object different from the trailer is present, or alternatively when the controller 110 determines that the object is moving relative to the vehicle 102.

FIG. 3 illustrates a selective pivoting of the extendable blind spot sensor assembly 104 from covering a first blind spot area 302 to covering a second blind spot area 304. The pivoting of the extendable blind spot sensor assembly 104 may occur due to the presence of a trailer 306, which is wider and would overlap the first blind spot area 302. In this example, the extendable blind spot sensor assembly 104 pivots or hinges until the field of view of the blind spot sensor (not illustrated in this view) is no longer at least partially blocked by the trailer.

Figure 4:
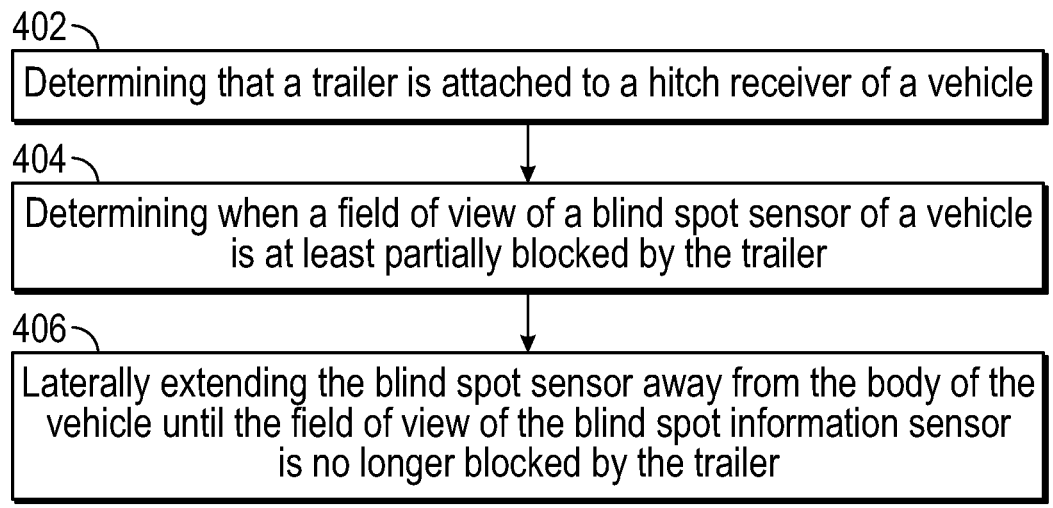
FIG. 4 is a flowchart of an example method of the present disclosure.

FIG. 4 is a flowchart of an example method of the present disclosure. The method includes a step 402 of determining that a trailer is attached to a hitch receiver of a vehicle. This could include, for example, detecting the presence of the trailer from camera images or from a wired connection between the trailer and the vehicle.

The method can also include a step 404 of determining when a field of view of a blind spot sensor of a vehicle is at least partially blocked by the trailer. For example, the blind spot sensor can determine that a signal is persisting in its field of view. This process can be performed when the vehicle is in a parked state to ensure that other objects are not present in the blind spot. The method can also include a step 406 of laterally extending the blind spot sensor away from the body of the vehicle until the field of view of the blind spot sensor is no longer blocked by the trailer.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," and the like indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that stores computer-executable instructions are computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A device, comprising:
    a blind spot sensor configured to monitor a blind spot of a vehicle attached to a trailer;
    an extender in mechanical communication with the blind spot sensor; and
    a controller that communicates with the extender to laterally move the blind spot sensor between a first position and a second position upon detecting the trailer that is persistently present in the blind spot of the vehicle,
    wherein the controller is configured to:
        determine that an object is moving relative to the trailer;
        determine that the object is in the blind spot based on determining that the object is moving relative to the trailer, wherein both the object and the trailer are in the blind spot;
        ignore a presence of the trailer in a blind spot sensor signal; and
        determine that a field of view of the blind spot sensor of the vehicle is fully blocked by the trailer when the vehicle is in a parked state.

2. The device according to claim 1, wherein the extender comprises a mechanical actuator, and wherein the controller
    determines that the trailer is present in the field of view of the blind spot sensor; and
    causes the mechanical actuator to laterally extend the blind spot sensor until the object is present in the field of view of the blind spot sensor.

3. The device according to claim 2, wherein the blind spot sensor is configured to pivot or hinge relative to the mechanical actuator.

4. The device according to claim 2, wherein the blind spot sensor is part of a tail light of the vehicle.

5. The device according to claim 4, wherein the tail light is configured to pivot or hinge relative to the mechanical actuator.

6. The device according to claim 1, wherein the extender comprises a mechanical actuator, and wherein the controller determines that the trailer is present in a field of view of the blind spot sensor when the blind spot sensor is fully extended to the second position.

7. The device according to claim 1, wherein the extender is manually maneuverable to move the blind spot sensor between the first position and the second position.

8. The device according to claim 1, wherein the extender is in mechanical communication with an actuator configured to move the blind spot sensor between the first position and the second position automatically upon detection of the object.

9. A system, comprising:
    a blind spot sensor mounted to a component of a vehicle;
    a mechanical actuator coupled to the component, the mechanical actuator configured to laterally extend the component away from the vehicle;
    a controller comprising a processor and a memory, the processor executing instructions stored in the memory to:
        determine when a trailer is attached to the vehicle; and
        cause the mechanical actuator to laterally extend the component away from the vehicle until the blind spot sensor is positioned to detect an object that is present in a blind spot of the vehicle;
        determine that the object is moving relative to the trailer;
        determine that the object is in the blind spot based on determining that the object is moving relative to the trailer, wherein both the object and the trailer are in the blind spot;
        ignore a presence of the trailer in a blind spot sensor signal; and
        determine that a field of view of the blind spot sensor of the vehicle is fully blocked by the trailer when the vehicle is in a parked state.

10. The system according to claim 9, wherein the component comprises one of a tail light or a rear quarter panel of the vehicle.

11. A method, comprising:
determining that a trailer is attached to a vehicle;
determining that the trailer is present in a field of view of a blind spot sensor of the vehicle;
laterally extending the blind spot sensor away from a body of the vehicle until an object is present in the field of view of the blind spot sensor;
determining that the object is moving relative to the trailer;
determining that the object is in the blind spot based on determining that the object is moving relative to the trailer, wherein both the object and the trailer are in the blind spot;
ignoring a presence of the trailer in a blind spot sensor signal; and
determining that the field of view of the blind spot sensor of the vehicle is fully blocked by the trailer when the vehicle is in a parked state.

12. The method according to claim 11, further comprising activating the blind spot sensor when the object is present in the field of view of the blind spot sensor.

13. The method according to claim 11, further comprising:
determining that the blind spot sensor is fully extended; and
determining that the trailer is still present in the field of view of blind spot sensor.

14. The method according to claim 11, wherein the blind spot sensor monitors a blind spot that is located outside a perimeter of the trailer.

15. The device according to claim 1, wherein detecting, by the controller, that the trailer is persistently present in the blind spot of the vehicle comprises determining that a wired connection exists between a socket of the vehicle and the trailer.

16. The device according to claim 1, wherein detecting, by the controller, that the trailer is persistently present in the blind spot of the vehicle comprises determining the presence of the trailer in an image captured by a backup camera mounted on the vehicle.

17. The device according to claim 1, wherein detecting, by the controller, that the trailer is persistently present in the blind spot of the vehicle comprises selecting a trailer connected blind spot mode from a menu provided on a human machine interface.

18. The system according to claim 9, wherein ignoring, by the controller, the presence of the trailer comprises the controller determining that the object is present in the blind spot of the vehicle only when the object is different than the trailer.

* * * * *